D. CUMMING, Jr.

Improvement in Washers for Bolts.

No. 132,807.                                   Patented Nov. 5, 1872.

Cha<sup>s</sup> H. Smith,
Geo. T. Pinckney       Witnesses.

INVENTOR
David Cumming Jr.
Per. Lemuel W. Serrell
ATTY.

UNITED STATES PATENT OFFICE.

DAVID CUMMING, JR., OF BROOKLYN, NEW YORK.

IMPROVEMENT IN WASHERS FOR BOLTS.

Specification forming part of Letters Patent No. 132,807, dated November 5, 1872.

*To all whom it may concern:*

Be it known that I, DAVID CUMMING, Jr., of Brooklyn, Kings county, State of New York, have invented an Improved Washer for Bolts, of which the following is a specification:

Before my invention a wooden lock-nut had been screwed upon a bolt to prevent the metal nut unscrewing, and wooden bars have been bolted to the sides of rail in railways.

My invention, as distinguished from the foregoing, consists in a wooden washer with the fibers of the wood running parallel or nearly so with the bolt, in combination with metal caps enclosing one or both ends of the washer, to prevent the same splitting, and to confine the wood under the pressure to which it is subjected by the nut.

I find that wood will resist a very heavy pressure endwise, when confined so as not to split, and at the same time there will be sufficient elasticity to allow for expansion and contraction and to prevent the nuts working loose upon the bolts employed with the fish-plates of railway bars.

Figure 1:
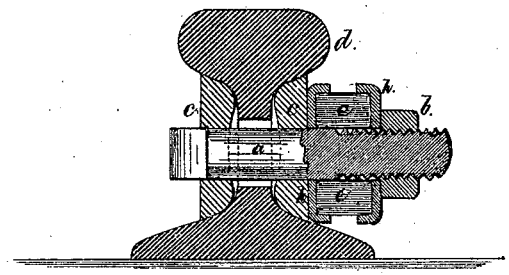
Figure 2:
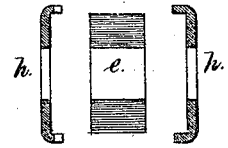

In the drawing, Fig. 1 is a section of the said washer and the parts connected by the bolt, and Fig. 2 represents the washer and its metal caps in section, separately.

The bolt $a$ and nut $b$ are to be employed on any occasion wherever available; I have shown them as employed for clamping the fish-plates $c\ c$ to the railway bar $d$.

Figure 3:
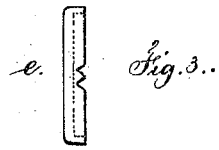

The wooden washer $e$ is of the desired size, with an opening through the center to pass the bolt $a$ freely, and the direction of the grain of the wood is parallel or nearly so with the bolt $a$. The metal caps $h\ h$ are made with flanges to confine the wood, thereby preventing any portion becoming loose, even if the wood should split from pressure or shrinkage. A tooth may be made in the flange, as seen in Fig. 3, to be turned into the wood, and to keep the parts together. One of these metal caps $h$ might be dispensed with, if there was a proper recess in the fish-plate for receiving the end of the wooden washer.

The wood washer must be made sufficiently thick to allow of the same being compressed without the caps coming into contact so as to preserve the elasticity. This washer may be applied beneath the nut or the head of the bolt.

I claim as my invention—

The washer for bolts, made of wood, combined with and supported by the metal caps, in the manner set forth.

Signed by me this 25th day of June, A. D. 1872.

DAVID CUMMING, JR.

Witnesses:
GEO. T. PINCKNEY,
CHAS. H. SMITH.